US012710285B2

(12) United States Patent
Galinho

(10) Patent No.: US 12,710,285 B2
(45) Date of Patent: Aug. 18, 2026

(54) CONFLATION BETWEEN TARGET AND SOURCE ROAD POLYLINES FROM GIS DATABASES

(71) Applicant: Trimble Inc., Westminster, CO (US)

(72) Inventor: Joao Andre de Franca Ferreira Galinho, Jersey City, NJ (US)

(73) Assignee: Trimble Inc., Westminster, CO (US)

(*) Notice: Subject to any disclaimer, the term of this patent is extended or adjusted under 35 U.S.C. 154(b) by 73 days.

(21) Appl. No.: 18/888,541

(22) Filed: Sep. 18, 2024

(65) Prior Publication Data

US 2026/0079029 A1 Mar. 19, 2026

(51) Int. Cl.
*G01C 21/00* (2006.01)

(52) U.S. Cl.
CPC ....... *G01C 21/387* (2020.08); *G01C 21/3815* (2020.08); *G01C 21/3867* (2020.08); *G01C 21/3896* (2020.08)

(58) Field of Classification Search
CPC .............. G01C 21/387; G01C 21/3815; G01C 21/3867; G01C 21/3896
See application file for complete search history.

(56) References Cited

U.S. PATENT DOCUMENTS

2015/0242674 A1* 8/2015 Ahmed .................. G06T 17/05
382/113

FOREIGN PATENT DOCUMENTS

CN 108492276 B * 1/2018 ............... G06T 7/00

OTHER PUBLICATIONS

Extended European Search Report for Application No. 25197338.4-1009, mailed Feb. 19, 2026, 9 pages.

* cited by examiner

*Primary Examiner* — Brian P Sweeney
(74) *Attorney, Agent, or Firm* — Kilpatrick Townsend & Stockton LLP

(57) ABSTRACT

Described herein are systems, methods, and other techniques for performing conflation between target road polylines and source road polylines stored in GIS databases. A pairing of a target road polyline and a source road polyline is obtained. The target road polyline and the source road polyline each include a sequence of connected 2D or 3D vertices that form a continuous line. A similarity score is computed between the target road polyline and the source road polyline based on one or more similarity metrics. A conflation classification is assigned to the target road polyline, the source road polyline, or the pairing based on the similarity score. The conflation classification is one of a set of possible conflation classifications. A post-classification action is performed based on the conflation classification.

19 Claims, 11 Drawing Sheets

Source Road Polyline 214
Target Road Polyline 216
max
Distance (Hausdorff) = max Source Road Polyline 214
Target Road Polyline 216
max
Distance (Hausdorff) = max

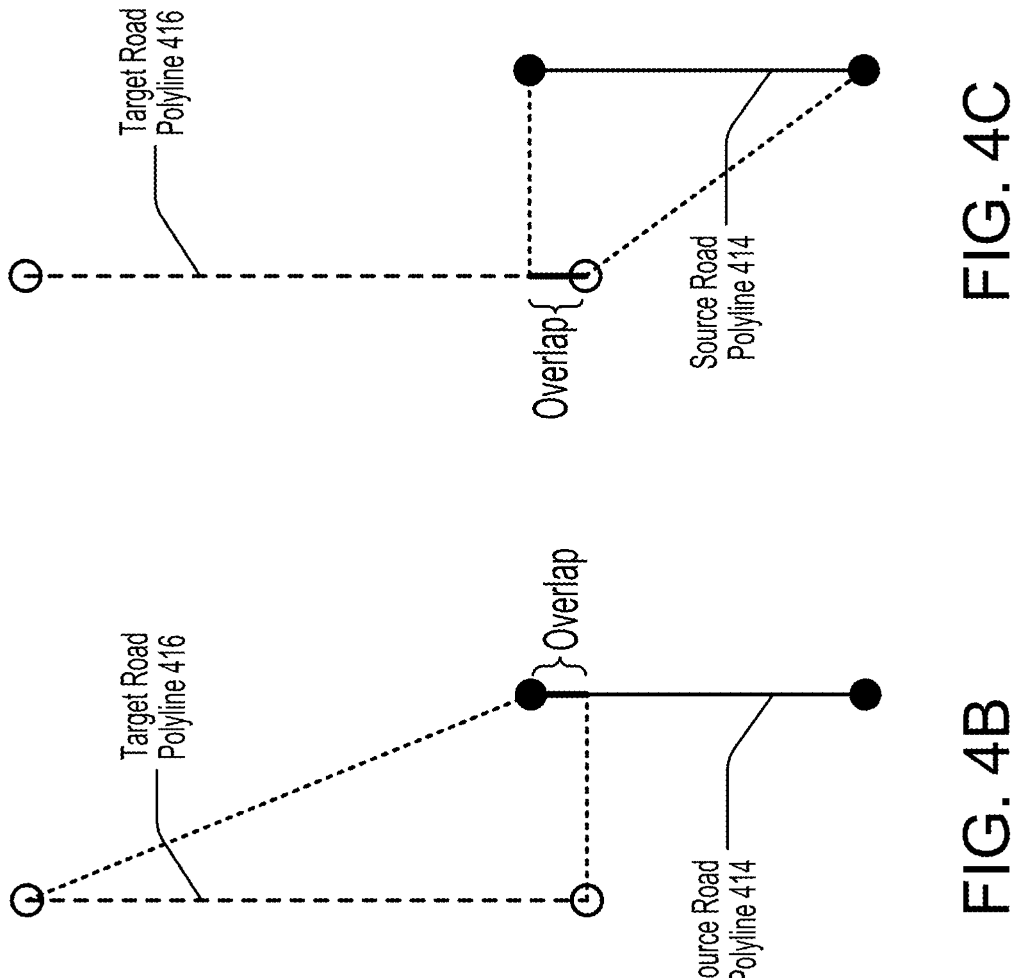
FIG. 4C
FIG. 4B
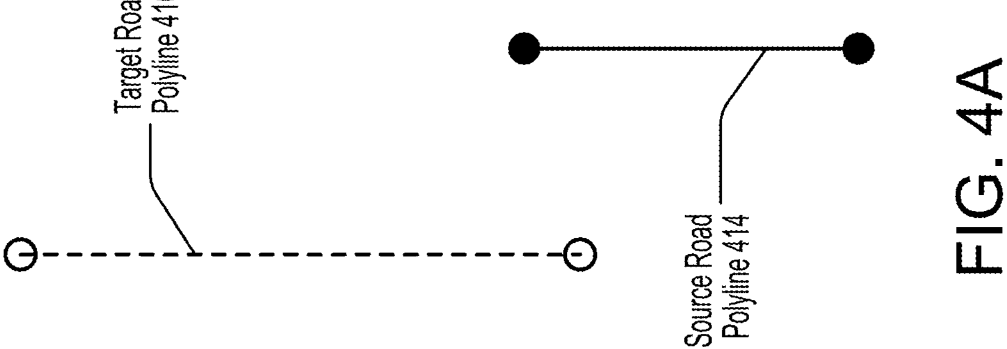
FIG. 4A

CONFLATION BETWEEN TARGET AND SOURCE ROAD POLYLINES FROM GIS DATABASES

BACKGROUND OF THE INVENTION

In Geographic Information Systems (GIS) databases, roads are typically represented using vector data models, where the features of the roads are depicted as geometric shapes composed of vertices and lines. Such geometric shapes may be referred to as road polylines or linestrings. A collection of road polylines may be stored in a GIS database along with other map data. Maintaining accurate and up-to-date map data is important for the value of products offered by mapping companies. One method to ensure current and precise map data involves comparing existing maps with updated sources (e.g., government sources) to determine which road polylines from the source already exist in the map data and which road polylines may need to be added.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method of performing conflation between a set of target road polylines and a set of source road polylines, the computer-implemented method comprising: obtaining a pairing of a target road polyline and a source road polyline, the target road polyline from the set of target road polylines and the source road polyline from the set of source road polylines, wherein the target road polyline and the source road polyline each include a sequence of connected vertices that form a continuous line; computing a similarity score between the target road polyline and the source road polyline based on one or more similarity metrics; assigning a conflation classification to the target road polyline, the source road polyline, or the pairing based on the similarity score, the conflation classification being one of a set of possible conflation classifications; and performing a post-classification action based on the conflation classification.

Example 2 is the computer-implemented method of example(s) 1, wherein the one or more similarity metrics include at least one of: a distance between the target road polyline and the source road polyline; a distance delta between the target road polyline and the source road polyline; an overlap between the target road polyline and the source road polyline; or an angle between the target road polyline and the source road polyline.

Example 3 is the computer-implemented method of example(s) 2, wherein the distance between the target road polyline and the source road polyline is computed by: projecting each of the connected vertices of the target road polyline onto the source road polyline to generate target-to-source projections and identifying a maximum distance of the target-to-source projections; or projecting each of the connected vertices of the source road polyline onto the target road polyline to generate source-to-target projections and identifying a maximum distance of the source-to-target projections.

Example 4 is the computer-implemented method of example(s) 2-3, wherein the distance delta between the target road polyline and the source road polyline is computed by: projecting each of the connected vertices of the target road polyline onto the source road polyline to generate target-to-source projections, identifying a maximum distance and a minimum distance of the target-to-source projections, and computing a difference between the maximum distance and the minimum distance of the target-to-source projections; or projecting each of the connected vertices of the source road polyline onto the target road polyline to generate source-to-target projections, identifying a maximum distance and a minimum distance of the source-to-target projections, and computing a difference between the maximum distance and the minimum distance of the source-to-target projections.

Example 5 is the computer-implemented method of example(s) 2-4, wherein the overlap between the target road polyline and the source road polyline is computed by: projecting two of the connected vertices of the target road polyline onto the source road polyline to generate target-to-source projections that connect with the source road polyline at a set of connection points along the source road polyline and computing a distance between the set of connection points along the source road polyline; or projecting two of the connected vertices of the source road polyline onto the target road polyline to generate source-to-target projections that connect with the target road polyline at a set of connection points along the target road polyline and computing a distance between the set of connection points along the target road polyline.

Example 6 is the computer-implemented method of example(s) 2-5, wherein the angle between the target road polyline and the source road polyline is computed by: projecting two of the connected vertices of the target road polyline onto the source road polyline to generate target-to-source projections that connect with the source road polyline at a set of connection points along the source road polyline and computing an angle between a first vector formed by the two of the connected vertices of the target road polyline and a second vector formed by the set of connection points along the source road polyline; or projecting two of the connected vertices of the source road polyline onto the target road polyline to generate source-to-target projections that connect with the target road polyline at a set of connection points along the target road polyline and computing an angle between a first vector formed by the two of the connected vertices of the source road polyline and a second vector formed by the set of connection points along the target road polyline.

Example 7 is the computer-implemented method of example(s) 2-6, wherein computing the similarity score between the target road polyline and the source road polyline based on one or more similarity metrics includes setting the similarity score to zero if the one or more similarity metrics are greater than or less than one or more corresponding thresholds.

Example 8 is the computer-implemented method of example(s) 1-7, wherein the set of source road polylines are retrieved from a government database.

Example 9 is the computer-implemented method of example(s) 1-8, wherein performing the post-classification action includes: adding the source road polyline to the set of target road polylines as stored in a target database; modifying the sequence of connected vertices of the target road polyline as stored in the target database based on the sequence of connected vertices of the source road polyline; or deleting the target road polyline from the target database.

Example 10 is the computer-implemented method of example(s) 1-9, wherein performing the post-classification action includes modifying one or more of the set of target road polylines as stored in a target database.

Example 11 is a non-transitory computer-readable medium comprising instructions that, when executed by one or more processors, cause the one or more processors to perform operations comprising: obtaining a pairing of a target road polyline and a source road polyline, the target road polyline from a set of target road polylines and the source road polyline from a set of source road polylines, wherein the target road polyline and the source road polyline each include a sequence of connected vertices that form a continuous line; computing a similarity score between the target road polyline and the source road polyline based on one or more similarity metrics; assigning a conflation classification to the target road polyline, the source road polyline, or the pairing based on the similarity score, the conflation classification being one of a set of possible conflation classifications; and performing a post-classification action based on the conflation classification.

Example 12 is the non-transitory computer-readable medium of example(s) 11, wherein the one or more similarity metrics include at least one of: a distance between the target road polyline and the source road polyline; a distance delta between the target road polyline and the source road polyline; an overlap between the target road polyline and the source road polyline; or an angle between the target road polyline and the source road polyline.

Example 13 is the non-transitory computer-readable medium of example(s) 12, wherein the distance between the target road polyline and the source road polyline is computed by: projecting each of the connected vertices of the target road polyline onto the source road polyline to generate target-to-source projections and identifying a maximum distance of the target-to-source projections; or projecting each of the connected vertices of the source road polyline onto the target road polyline to generate source-to-target projections and identifying a maximum distance of the source-to-target projections.

Example 14 is the non-transitory computer-readable medium of example(s) 12-13, wherein the distance delta between the target road polyline and the source road polyline is computed by: projecting each of the connected vertices of the target road polyline onto the source road polyline to generate target-to-source projections, identifying a maximum distance and a minimum distance of the target-to-source projections, and computing a difference between the maximum distance and the minimum distance of the target-to-source projections; or projecting each of the connected vertices of the source road polyline onto the target road polyline to generate source-to-target projections, identifying a maximum distance and a minimum distance of the source-to-target projections, and computing a difference between the maximum distance and the minimum distance of the source-to-target projections.

Example 15 is the non-transitory computer-readable medium of example(s) 12-14, wherein the overlap between the target road polyline and the source road polyline is computed by: projecting two of the connected vertices of the target road polyline onto the source road polyline to generate target-to-source projections that connect with the source road polyline at a set of connection points along the source road polyline and computing a distance between the set of connection points along the source road polyline; or projecting two of the connected vertices of the source road polyline onto the target road polyline to generate source-to-target projections that connect with the target road polyline at a set of connection points along the target road polyline and computing a distance between the set of connection points along the target road polyline.

Example 16 is the non-transitory computer-readable medium of example(s) 12-15, wherein the angle between the target road polyline and the source road polyline is computed by: projecting two of the connected vertices of the target road polyline onto the source road polyline to generate target-to-source projections that connect with the source road polyline at a set of connection points along the source road polyline and computing an angle between a first vector formed by the two of the connected vertices of the target road polyline and a second vector formed by the set of connection points along the source road polyline; or projecting two of the connected vertices of the source road polyline onto the target road polyline to generate source-to-target projections that connect with the target road polyline at a set of connection points along the target road polyline and computing an angle between a first vector formed by the two of the connected vertices of the source road polyline and a second vector formed by the set of connection points along the target road polyline.

Example 17 is the non-transitory computer-readable medium of example(s) 12-16, wherein computing the similarity score between the target road polyline and the source road polyline based on one or more similarity metrics includes setting the similarity score to zero if the one or more similarity metrics are greater than or less than one or more corresponding thresholds.

Example 18 is the non-transitory computer-readable medium of example(s) 11-17, wherein the set of source road polylines are retrieved from a government database.

Example 19 is the non-transitory computer-readable medium of example(s) 11-18, wherein performing the post-classification action includes: adding the source road polyline to the set of target road polylines as stored in a target database; modifying the sequence of connected vertices of the target road polyline as stored in the target database based on the sequence of connected vertices of the source road polyline; or deleting the target road polyline from the target database.

Example 20 is the non-transitory computer-readable medium of example(s) 11-19, wherein performing the post-classification action includes modifying one or more of the set of target road polylines as stored in a target database.

Example 21 is a system comprising: one or more processors; and a computer-readable medium comprising instructions that, when executed by the one or more processors, cause the one or more processors to perform operations comprising: obtaining a pairing of a target road polyline and a source road polyline, the target road polyline from a set of target road polylines and the source road polyline from a set of source road polylines, wherein the target road polyline and the source road polyline each include a sequence of connected vertices that form a continuous line; computing a similarity score between the target road polyline and the source road polyline based on one or more similarity metrics; assigning a conflation classification to the target road polyline, the source road polyline, or the pairing based on the similarity score, the conflation classification being one of a set of possible conflation classifications; and performing a post-classification action based on the conflation classification.

Example 22 is the non-transitory computer-readable medium of example(s) 21, wherein the one or more similarity metrics include at least one of: a distance between the target road polyline and the source road polyline; a distance delta between the target road polyline and the source road polyline; an overlap between the target road polyline and the source road polyline; or an angle between the target road polyline and the source road polyline.

Example 23 is the non-transitory computer-readable medium of example(s) 22, wherein the distance between the target road polyline and the source road polyline is computed by: projecting each of the connected vertices of the target road polyline onto the source road polyline to generate target-to-source projections and identifying a maximum distance of the target-to-source projections; or projecting each of the connected vertices of the source road polyline onto the target road polyline to generate source-to-target projections and identifying a maximum distance of the source-to-target projections.

Example 24 is the non-transitory computer-readable medium of example(s) 22-23, wherein the distance delta between the target road polyline and the source road polyline is computed by: projecting each of the connected vertices of the target road polyline onto the source road polyline to generate target-to-source projections, identifying a maximum distance and a minimum distance of the target-to-source projections, and computing a difference between the maximum distance and the minimum distance of the target-to-source projections; or projecting each of the connected vertices of the source road polyline onto the target road polyline to generate source-to-target projections, identifying a maximum distance and a minimum distance of the source-to-target projections, and computing a difference between the maximum distance and the minimum distance of the source-to-target projections.

Example 25 is the non-transitory computer-readable medium of example(s) 22-24, wherein the overlap between the target road polyline and the source road polyline is computed by: projecting two of the connected vertices of the target road polyline onto the source road polyline to generate target-to-source projections that connect with the source road polyline at a set of connection points along the source road polyline and computing a distance between the set of connection points along the source road polyline; or projecting two of the connected vertices of the source road polyline onto the target road polyline to generate source-to-target projections that connect with the target road polyline at a set of connection points along the target road polyline and computing a distance between the set of connection points along the target road polyline.

Example 26 is the non-transitory computer-readable medium of example(s) 22-25, wherein the angle between the target road polyline and the source road polyline is computed by: projecting two of the connected vertices of the target road polyline onto the source road polyline to generate target-to-source projections that connect with the source road polyline at a set of connection points along the source road polyline and computing an angle between a first vector formed by the two of the connected vertices of the target road polyline and a second vector formed by the set of connection points along the source road polyline; or projecting two of the connected vertices of the source road polyline onto the target road polyline to generate source-to-target projections that connect with the target road polyline at a set of connection points along the target road polyline and computing an angle between a first vector formed by the two of the connected vertices of the source road polyline and a second vector formed by the set of connection points along the target road polyline.

Example 27 is the non-transitory computer-readable medium of example(s) 22-26, wherein computing the similarity score between the target road polyline and the source road polyline based on one or more similarity metrics includes setting the similarity score to zero if the one or more similarity metrics are greater than or less than one or more corresponding thresholds.

Example 28 is the non-transitory computer-readable medium of example(s) 22-27, wherein the set of source road polylines are retrieved from a government database.

Example 29 is the non-transitory computer-readable medium of example(s) 22-28, wherein performing the post-classification action includes: adding the source road polyline to the set of target road polylines as stored in a target database; modifying the sequence of connected vertices of the target road polyline as stored in the target database based on the sequence of connected vertices of the source road polyline; or deleting the target road polyline from the target database.

Example 30 is the non-transitory computer-readable medium of example(s) 22-29, wherein performing the post-classification action includes modifying one or more of the set of target road polylines as stored in a target database.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIGS. 4A-4C illustrate example computations of an overlap between a target road polyline and a source road polyline.

DETAILED DESCRIPTION OF THE INVENTION

Figure 1:
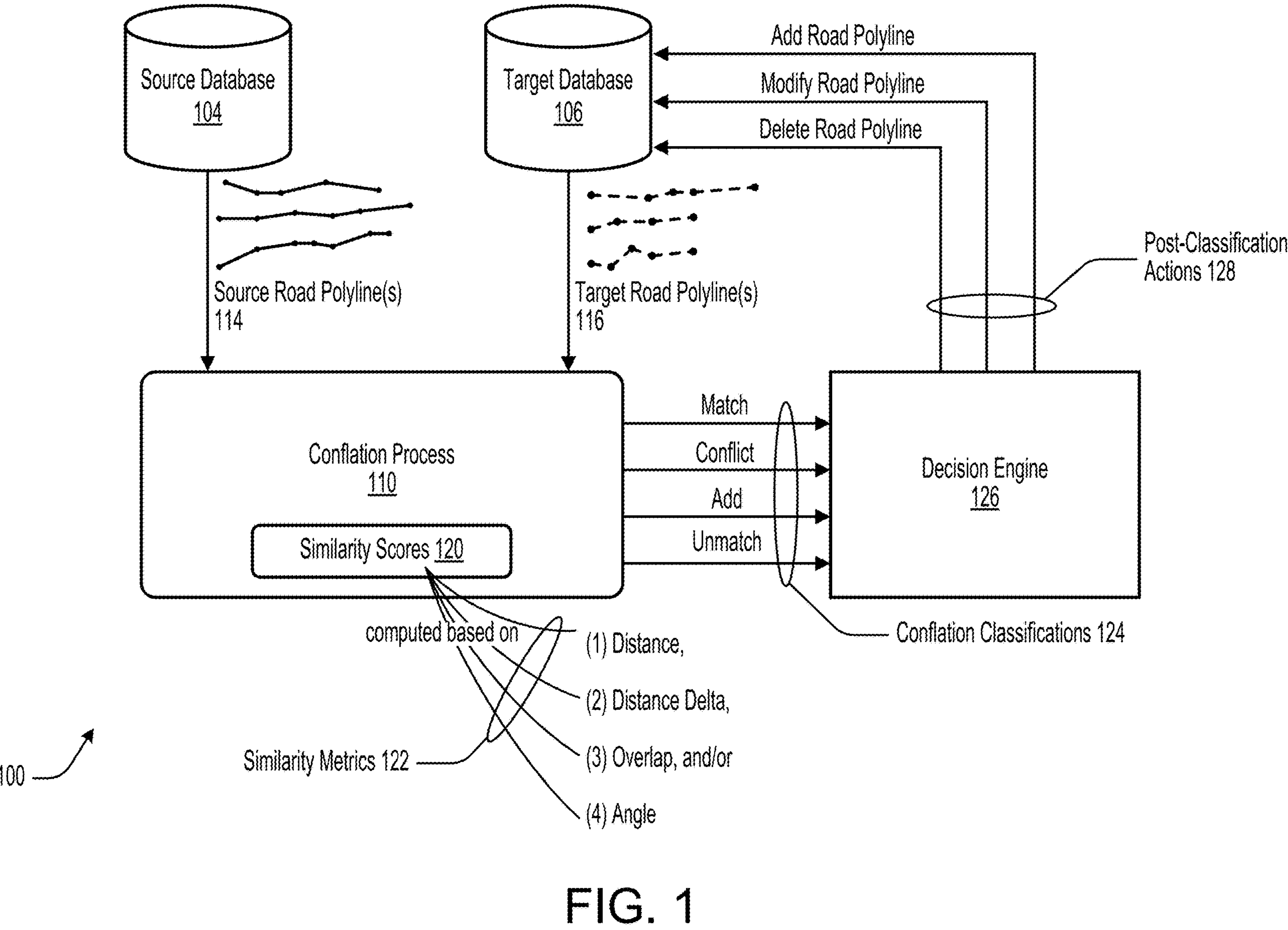
FIG. 1 illustrates an example system for performing conflation between a set of target road polylines from a target database and a set of source road polylines from a source database.

Map data maintained by a mapping company may include a collection of polylines (alternatively referred to as "road polylines") representing real-world roads. Each road polyline may include a sequence of connected vertices that form a continuous line. Each vertex in the polyline is defined by coordinates, typically latitude and longitude in a geographic coordinate system. The road polyline may capture the path and shape of the road, following its curves and intersections. Maintaining accurate and up-to-date map data is important for the value provided by mapping companies. One method for ensuring current map data involves comparing it with updated sources (e.g., government sources) for each city, county, or state, etc. This comparison process, termed "conflation", may include identifying which roads from the sources already exist in the map data and determining which new roads need to be added.

Performing conflation at a large scale is an immensely time-consuming and labor-intensive task, making manual execution impractical. To overcome this challenge, a conflation process is described herein to automatically match each road in the source data to one or multiple roads in the map data. Roads from the source database that cannot be matched by this process are classified as potential new additions. Roads that are matched to one or multiple roads in the map data may be flagged and processed by a set of decision rules. These results may be manually reviewed by a Geographic Information System (GIS) team, which makes necessary edits and updates to the map data accordingly. The accuracy of the conflation process directly impacts the speed and precision of the GIS team's processing. Conventional conflation processes match roads based solely on their own geometric properties and the geometric properties of the road to which they are attempting to match. While functional, these processes struggle with complex scenarios such as intricate intersections and small links, primarily because they do not consider the surrounding context and neighboring roads. This limitation has highlighted the need for a solution that improves matching accuracy in these intricate scenarios.

The conflation process described herein addresses these limitations by first calculating the geometric similarity between every eligible road pair from the source data and the map data (target) in three conflation directions: undirected, source-to-target, and target-to-source, the undirected being the maximum (or minimum, whichever is worse) of source-to-target and target-to-source. This process generates three similarity matrices, which are used to frame the conflation problem as a linear programming optimization problem that can be solved using a linear programming solver. In some examples, the conflation process uses a modified Hausdorff distance metric (alternatively referred to as the "projection distance") tailored for polylines rather than discrete point sets. This metric calculates the directed distance between two polylines by considering the distances between vertex points and their projections. Additionally, strict eligibility criteria based on this modified Hausdorff distance, distance delta, overlap, and angle are enforced in each conflation direction, ensuring only the most relevant road pairs are considered in the optimization problem.

After solving the linear programming problem, the conflation process identifies and flags invalid many-to-one matches as conflicts, which can then be processed by decision rules and/or reviewed by the GIS team. This post-process validation can address the inherent greediness of optimization algorithms and ensures high accuracy in the final conflation results. By integrating these novel components and techniques, the conflation process described herein significantly enhances the accuracy and efficiency of the conflation process, making it a state-of-the-art solution for this use case.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example system 100 for performing conflation between a set of target road polylines 116 from a target database 106 and a set of source road polylines 114 from a source database 104, in accordance with some embodiments of the present disclosure. Target database 106 may be maintained by a mapping company and source database 104 may be maintained by a government or other entity. Each target road polyline 116 and source road polyline 114 may include a sequence of connected two-dimensional (2D) or three-dimensional (3D) vertices that form a continuous line. For example, a linear line segment may extend between each successive pair of 2D vertices in a road polyline such that the continuous line is formed by one or more of such linear line segments.

System 100 may include a conflation process 110 running on a computing system having one or more processing and memory elements. Conflation process 110 may obtain (e.g., receive or retrieve) target road polylines 116 and source road polylines 114 from target database 106 and source database 104, respectively, and compute similarity scores 120 between different pairings of target road polylines 116 and source road polylines 114. In some examples, a similarity score 120 is computed for each possible pairing between target road polylines 116 and source road polylines 114, resulting in M×N similarity scores, where M is the number of target road polylines 116 and N is the number of source road polylines 114.

Similarity scores 120 may be computed based on one or more similarity metrics 122 including (1) distance, (2) distance delta, (3) overlap, and/or (4) angle. For example, each of similarity scores 120 may include contributions from one or more of similarity metrics 122 using a summation operation. Each of similarity scores 120 may, for example, include the sum of the contribution from the distance metric, the distance delta metric, the overlap metric, and/or the angle metric. In some examples, as described in reference to FIG. 6, the computed values for the similarity metrics may be compared to corresponding thresholds. If any one computed value is greater than (or less than for the overlap metric) the corresponding threshold, the similarity score is set to zero.

Based on the computed similarity score for a particular pairing, conflation process 110 may implement a linear programming solver to assign one of a set of possible conflation classifications 124 to the target road polyline in the pairing, the source road polyline in the pairing, or to the pairing itself. In some examples, conflation classifications 124 may include match, conflict, add, or unmatched. Conflation process 110 may assign the match classification if, based on similarity scores 120, the linear programming solver determines that target road polyline 116 is an appropriate match (or a most appropriate match) for source road polyline 114, and vice versa. Conflation process 110 may assign the conflict classification if, based on similarity scores 120, the linear programming solver determines that multiple target road polylines 116 are an appropriate match for a single source road polyline 114 or that multiple source road polylines 114 are an appropriate match for a single target road polyline 116.

Conflation process 110 may assign the add classification to source road polyline 114 if, based on similarity score 120, the linear programming solver determines that source road polyline 114 is not an appropriate match for any of target road polylines 116. Conflation process 110 may assign the unmatched classification to target road polyline 116 if, based on similarity score 120, the linear programming solver determines that target road polyline 116 is not an appropriate match for any of source road polylines 114.

A decision engine 126 may receive conflation classifications 124 from conflation process 110 and perform one or more post-classification actions 128 based on a set of decision rules. In some examples, each of post-classification actions 128 may include modifying at least one of target road polylines 116 as stored in target database 106. For a match classification, decision engine 126 may either leave target road polyline 116 unmodified or may optionally modify the points (vertices or line segments) of target road polyline 116 as stored in target database 106 to more closely align with source road polyline 114 to which target road polyline 116 is matched. For an add classification, decision engine 126 may generate a new target road polyline based on source road polyline 114 that was assigned the add classification and store the newly generated target road polyline in target database 106. For an unmatched classification, decision engine 126 may either leave target road polyline 116 unmodified or optionally delete target road polyline 116 from target database 106.

Decision engine 126 may employ a set of complex decision rules for conflict classifications. In some examples, the decision rules may identify cases where two target road polylines are sufficiently similar to a single source road polyline as corresponding to a twinned road case, which can occur when the actual road network is twinned but the source road indicates a single road. In such a case, decision engine 126 may leave the two target road polylines unmodified as stored in target database 106. In another example, the decision rules may determine whether the two target road polylines correspond to different portions of the source road polyline, in which case decision engine 126 may either leave the target road polylines unmodified, combine the target road polylines into a single target road polyline, and/or modify the points (vertices or line segments) of target road polylines to more closely align with the source road polyline. In some cases, road polylines that are assigned the conflict classification are flagged and may be manually reviewed by a GIS team.

In some examples, decision engine 126 may extract and account for road attributes from the source data to validate the existing attributes in the target data. As such, decision engine 126 need not only act upon the geometries, but may further consider certain road attributes (such as road name, address range, route number, etc.) to perform post-classification actions 128. In some examples, post-classification actions 128 may include modifying the road attributes for target road polylines 116 as stored in target database 106. For example, in response to a match classification, the road attributes for target road polyline 116 may be modified to include one or more of the road attributes for source road polyline 114.

Figure 2A:
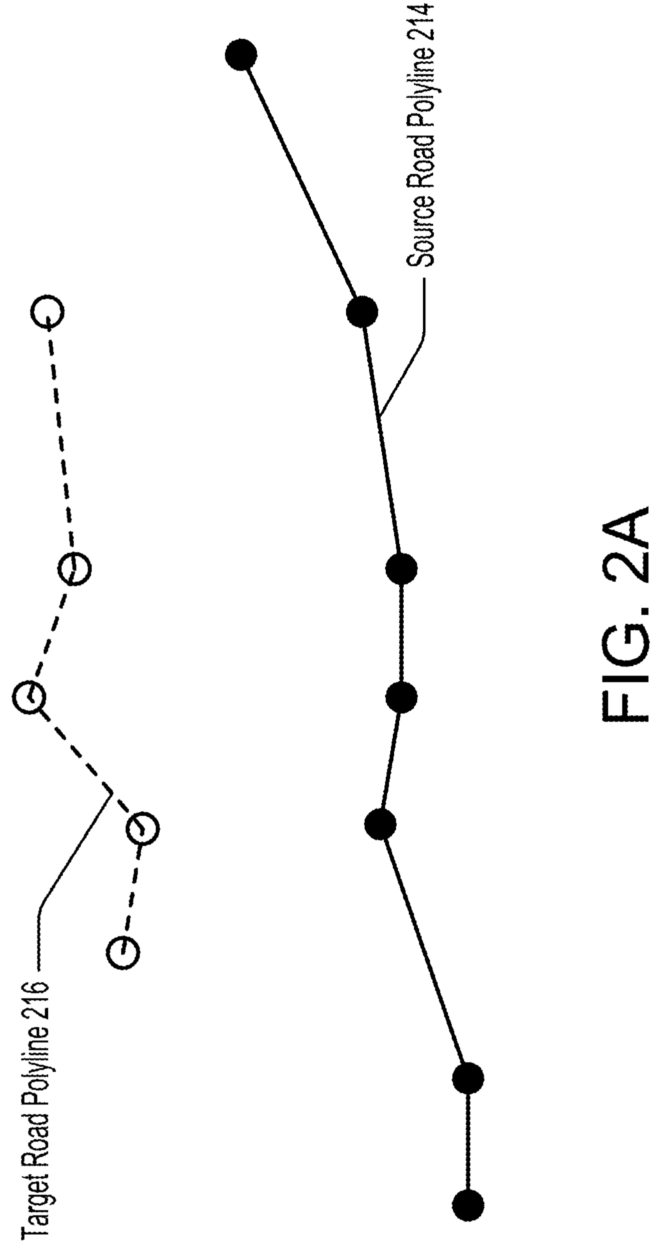
FIGS. 2A-2G illustrate example computations of a distance between a target road polyline and a source road polyline.
Figures 2B, 2C:
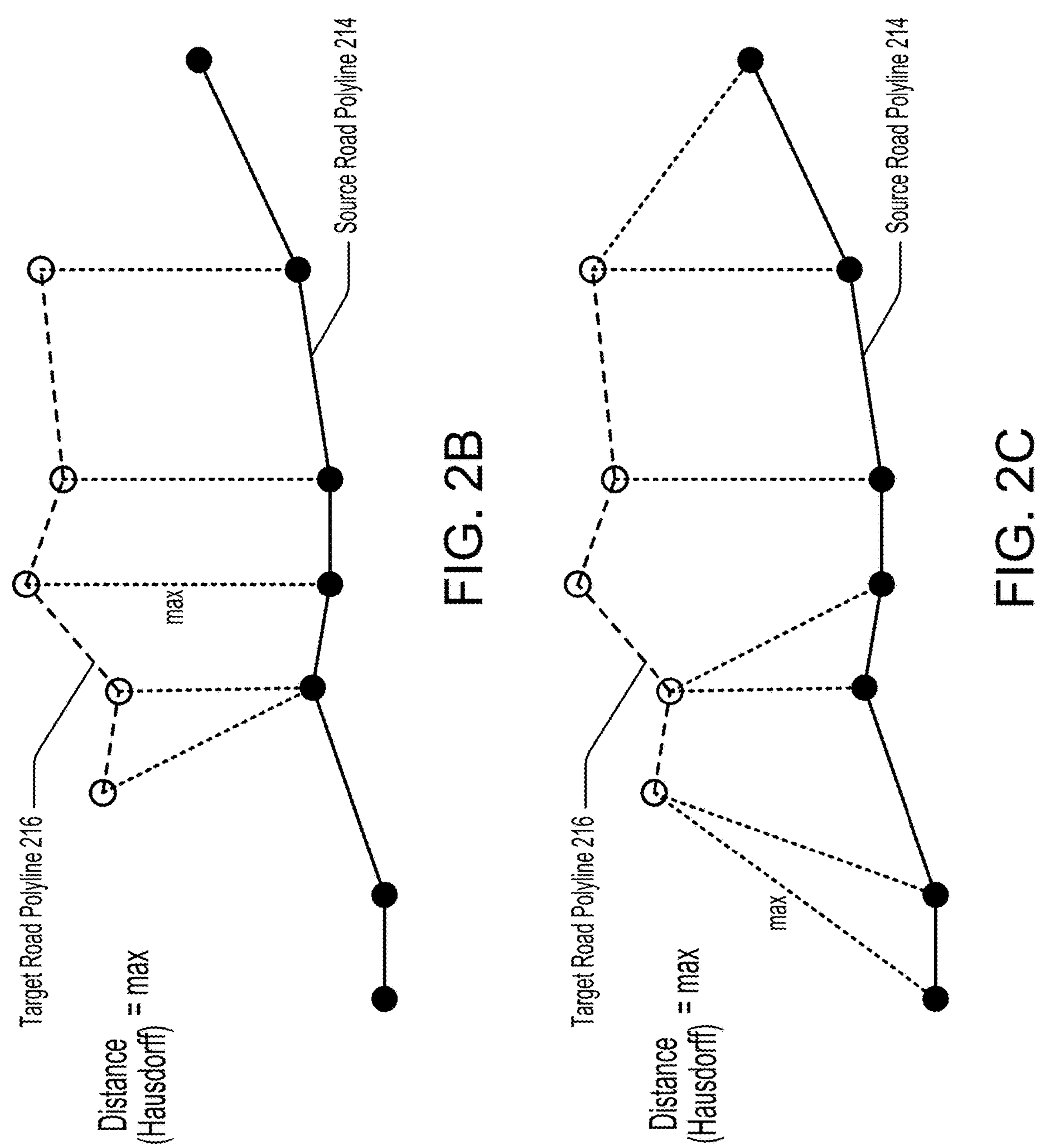
Figures 2D, 2E:
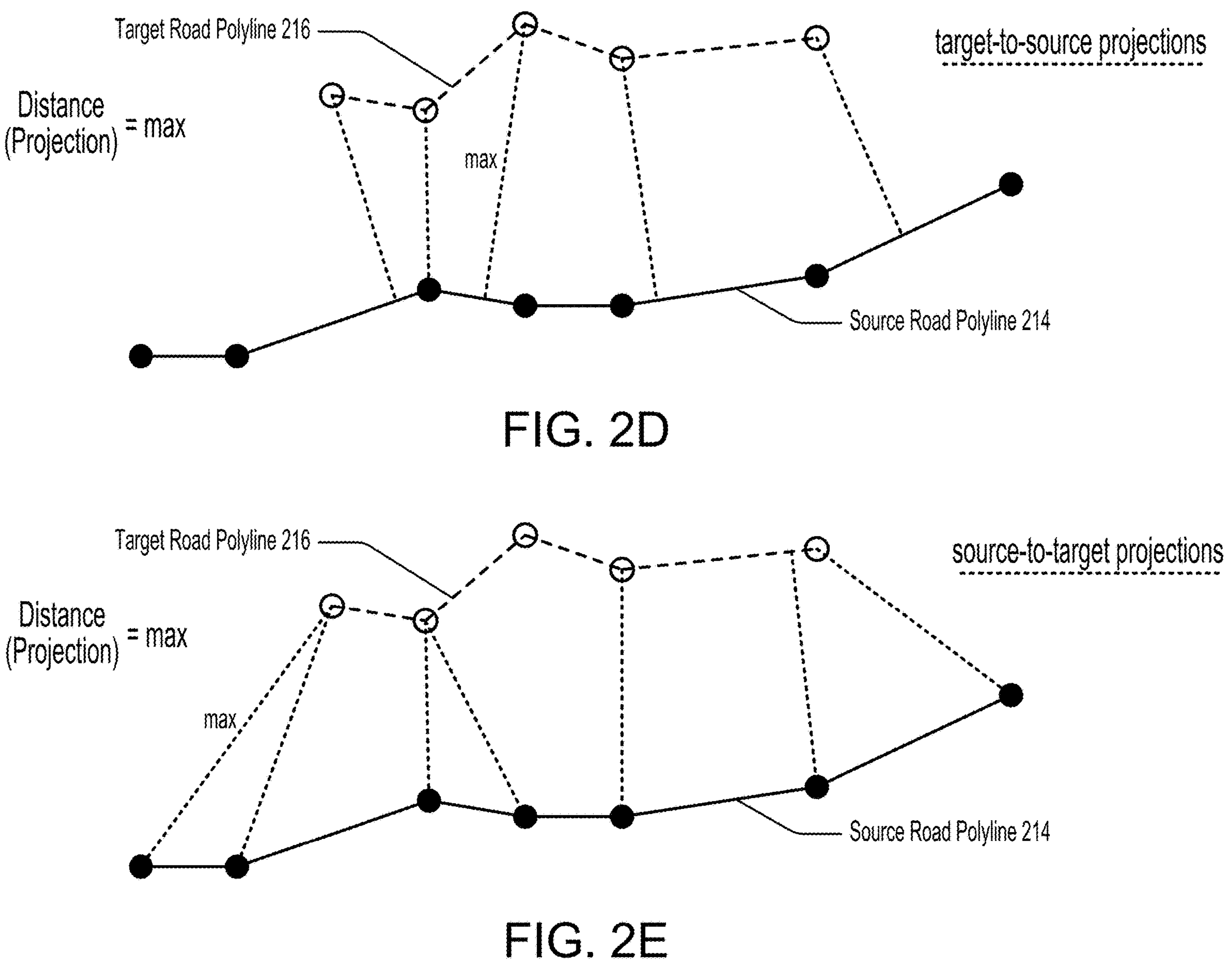
Figures 2F, 2G:
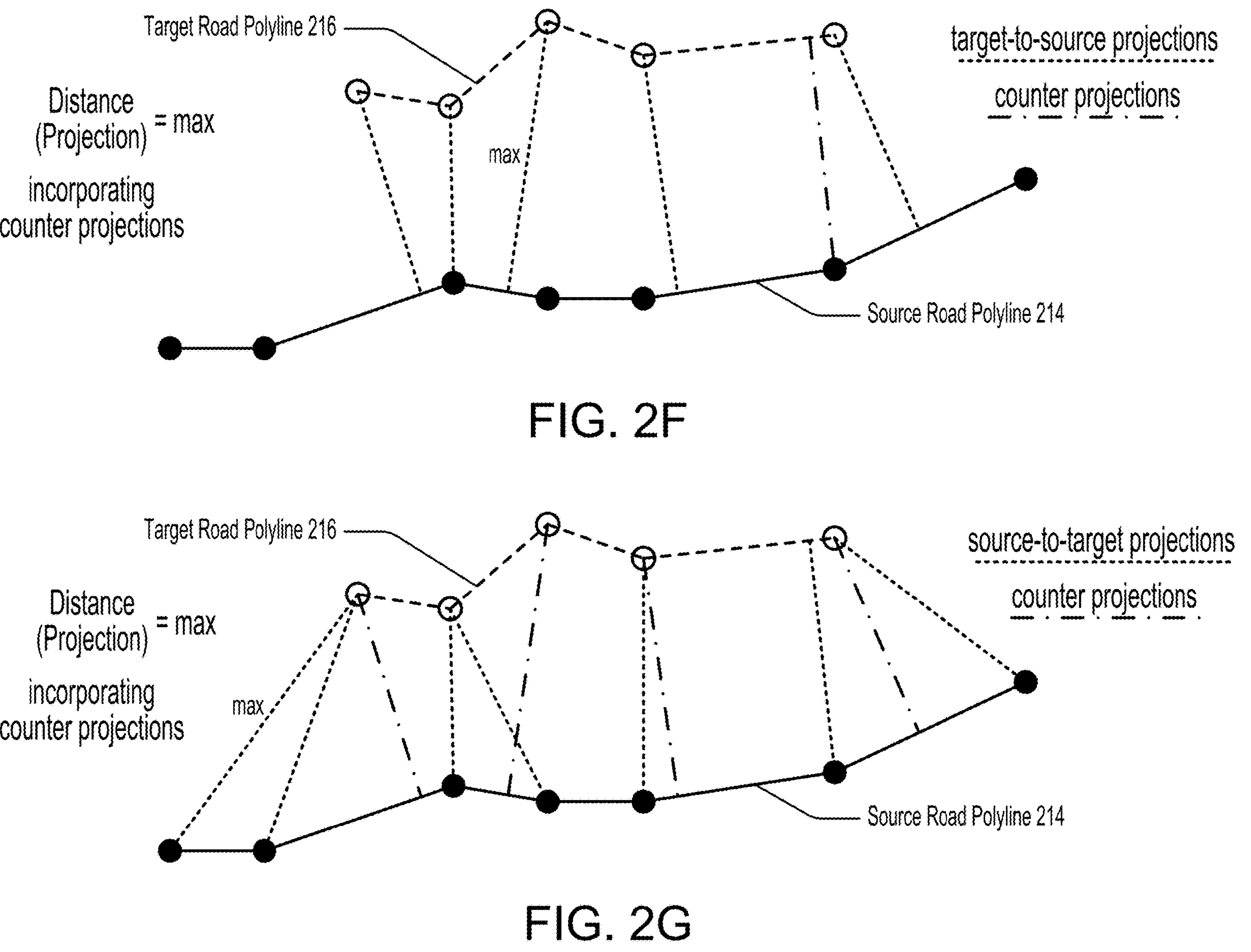

FIGS. 2A-2G illustrate example computations of a distance between a target road polyline 216 and a source road polyline 214, in accordance with some embodiments of the present disclosure. FIGS. 2B and 2C illustrate example computations of a Hausdorff distance and FIGS. 2D and 2E illustrate example computations of a projection distance. FIGS. 2F and 2G illustrate example computations of a projection distance incorporating counter projections. In FIG. 2B, the Hausdorff distance is computed in a first conflation direction (target to source) by connecting each vertex of target road polyline 216 to the closest vertex of source road polyline 214. The Hausdorff distance in the first conflation direction is set equal to the maximum distance of the connecting lines. In FIG. 2C, the Hausdorff distance is computed in a second conflation direction (source to target) by connecting each vertex of source road polyline 214 to the closest vertex of target road polyline 216. The Hausdorff distance in the second conflation direction is set equal to the maximum distance of the connecting lines.

In FIG. 2D, the projection distance is computed in the first conflation direction (target to source) by projecting each vertex of target road polyline 216 onto source road polyline 214, resulting in a set of target-to-source projections. Projecting a vertex of target road polyline 216 onto source road polyline 214 may include identifying the shortest distance to source road polyline 214, whether connecting to a vertex or a line segment of source road polyline 214. The projection distance in the first conflation direction is set equal to the maximum distance of the target-to-source projections. In FIG. 2E, the projection distance is computed in the second conflation direction (source to target) by projecting each vertex of source road polyline 214 onto target road polyline 216, resulting in a set of source-to-target projections. Projecting a vertex of source road polyline 214 onto target road polyline 216 may include identifying the shortest distance to target road polyline 216, whether connecting to a vertex or a line segment of target road polyline 216. The projection distance in the second conflation direction is set equal to the maximum distance of the source-to-target projections.

In FIG. 2F, the projection distance incorporating counter projections is computed in the first conflation direction (target to source) by projecting each vertex of target road polyline 216 onto source road polyline 214, resulting in a set of target-to-source projections, as described in reference to FIG. 2D. Furthermore, one or more counter projections are generated by projecting each vertex of source road polyline 214 onto target road polyline 216 and removing projections that connect to a vertex of target road polyline 216, leaving only those projections that connect to a line segment of target road polyline 216. The projection distance in the first conflation direction is set equal to the maximum distance of the target-to-source projections and the counter projections. In FIG. 2G, the projection distance incorporating counter projections is computed in the second conflation direction (source to target) by projecting each vertex of source road polyline 214 onto target road polyline 216, resulting in a set of source-to-target projections, as described in reference to FIG. 2E. Furthermore, one or more counter projections are generated by projecting each vertex of target road polyline 216 onto source road polyline 214 and removing projections that connect to a vertex of source road polyline 214, leaving only those projections that connect to a line segment of source road polyline 214. The projection distance in the second conflation direction is set equal to the maximum distance of the source-to-target projections and the counter projections.

Figures 3A, 3B:
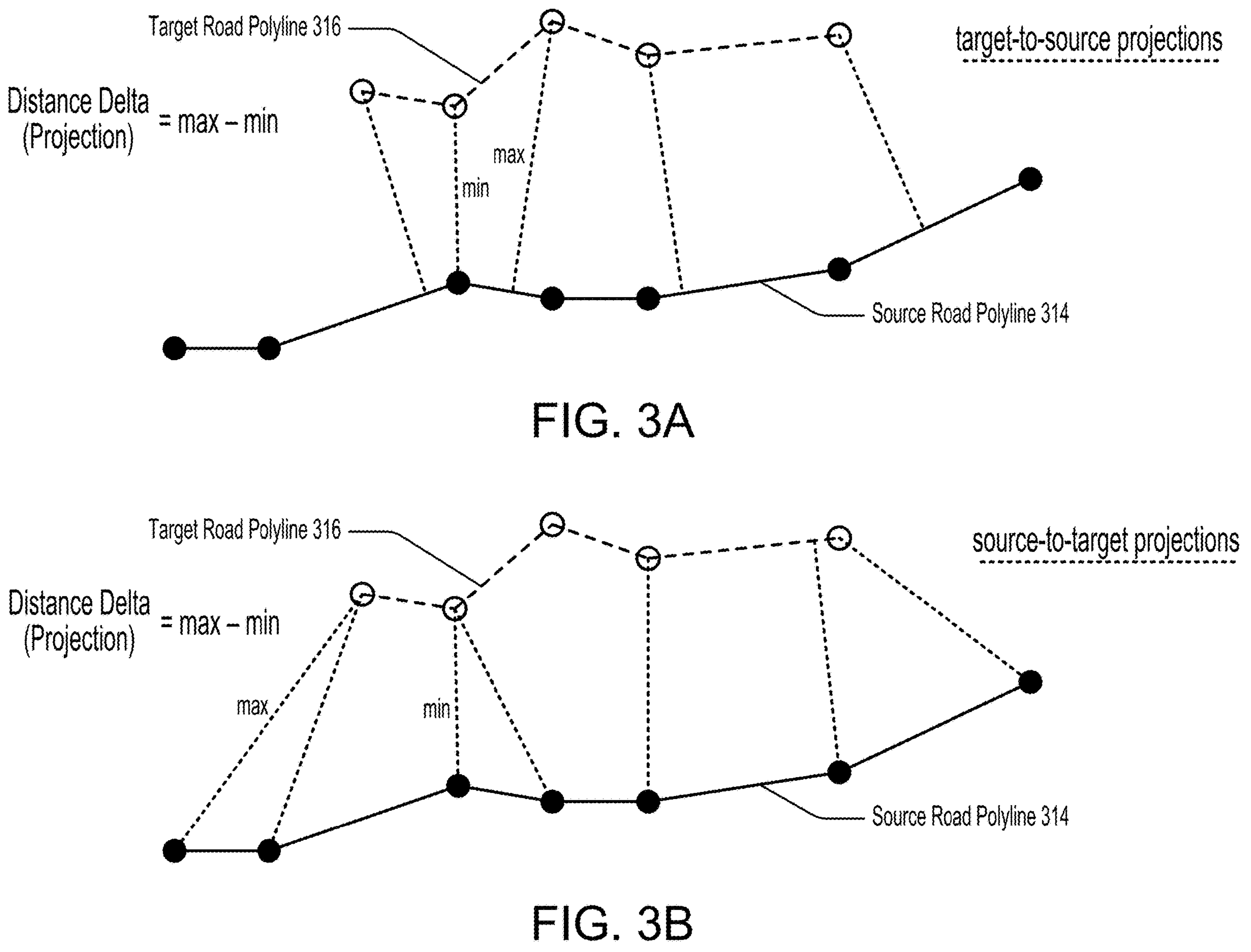
FIGS. 3A and 3B illustrate example computations of a distance delta between a target road polyline and a source road polyline.

FIGS. 3A and 3B illustrate example computations of a distance delta between a target road polyline 316 and a source road polyline 314, in accordance with some embodiments of the present disclosure. In FIG. 3A, the distance delta is computed in a first conflation direction (target to source) by projecting each vertex of target road polyline 316 onto source road polyline 314, resulting in a set of target-to-source projections. Projecting a vertex of target road polyline 316 onto source road polyline 314 may include identifying the shortest distance to source road polyline 314, whether connecting to a vertex or a line segment of source road polyline 314. The distance delta in the first conflation direction is set equal to the difference between the maximum distance of the target-to-source projections (and optionally any counter projections as described in reference to FIG. 2F) and the minimum distance between target road polyline 316 and source road polyline 314. In some cases, the minimum distance between target road polyline 316 and source road polyline 314 may correspond to the minimum distance of the target-to-source projections (and optionally any counter projections).

In FIG. 3B, the distance delta is computed in a second conflation direction (source to target) by projecting each vertex of source road polyline 314 onto target road polyline 316, resulting in a set of source-to-target projections. Projecting a vertex of source road polyline 314 onto target road polyline 316 may include identifying the shortest distance to target road polyline 316, whether connecting to a vertex or a line segment of target road polyline 316. The distance delta in the second conflation direction is set equal to the difference between the maximum distance of the source-to-target projections (and optionally any counter projections as described in reference to FIG. 2G) and the minimum distance between source road polyline 314 and target road polyline 316. In some cases, the minimum distance between source road polyline 314 and target road polyline 316 may correspond to the minimum distance of the source-to-target projections (and optionally any counter projections).

FIGS. 4A-4C illustrate example computations of an overlap between a target road polyline 416 and a source road polyline 414, in accordance with some embodiments of the present disclosure. In FIG. 4B, the overlap is computed in a first conflation direction (target to source) by projecting two vertices (e.g., the two end vertices) of target road polyline 416 onto source road polyline 414, resulting in a set of target-to-source projections that connect with source road polyline 414 at a set of connection points along source road polyline 414. Projecting a vertex of target road polyline 416 onto source road polyline 414 may include identifying the shortest distance to source road polyline 414, whether connecting to a vertex or a line segment of source road polyline 414. The overlap in the first conflation direction is set equal to the distance between the set of connection points along source road polyline 414.

In FIG. 4C, the overlap is computed in a second conflation direction (source to target) by projecting two vertices (e.g., the two end vertices) of source road polyline 414 onto target road polyline 416, resulting in a set of source-to-target projections that connect with target road polyline 416 at a set of connection points along target road polyline 416.

Projecting a vertex of source road polyline 414 onto target road polyline 416 may include identifying the shortest distance to target road polyline 416, whether connecting to a vertex or a line segment of target road polyline 416. The overlap in the second conflation direction is set equal to the distance between the set of connection points along target road polyline 416.

Figures 5A, 5B, 5C:
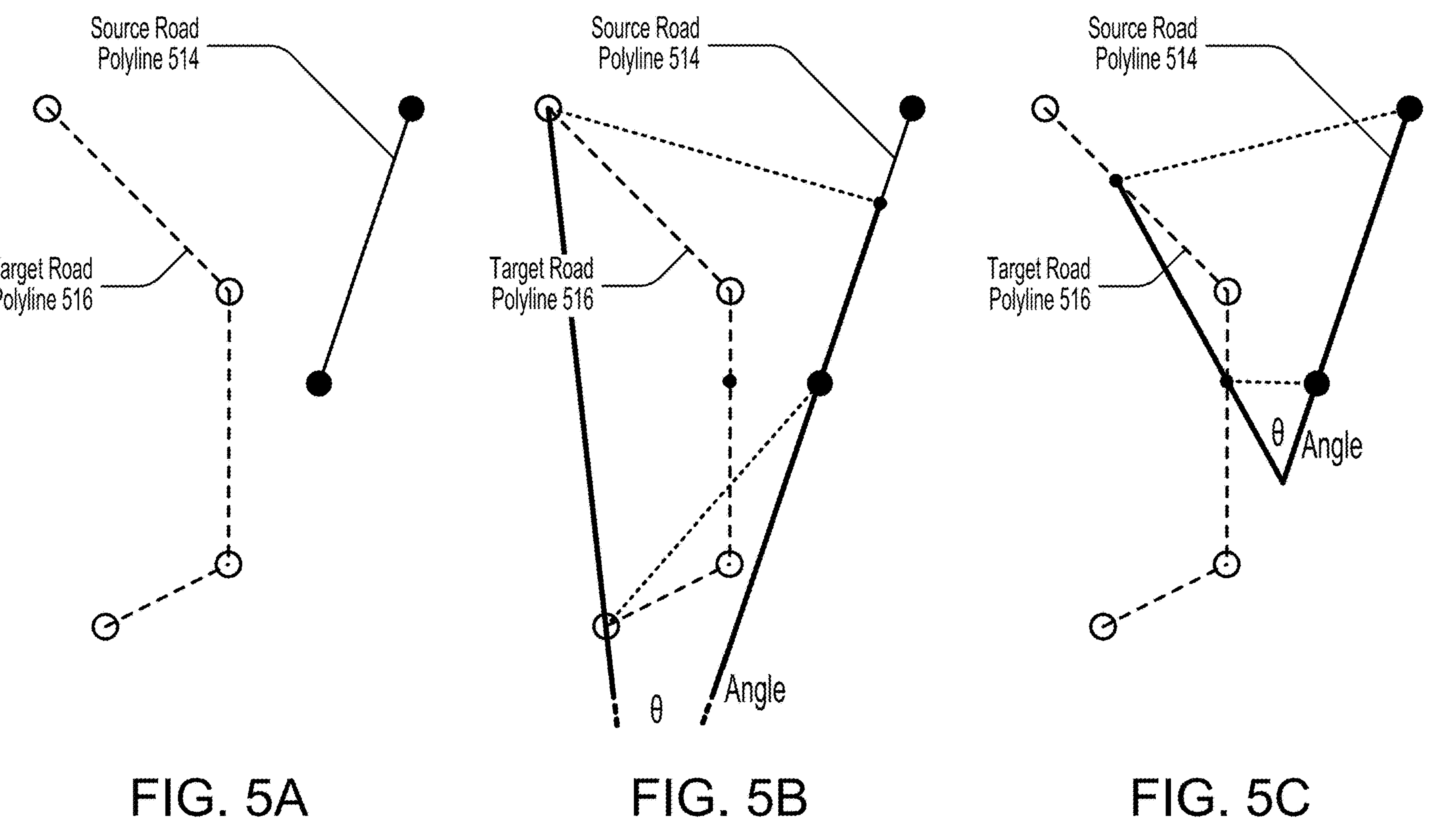
FIGS. 5A-5C illustrate example computations of an angle between a target road polyline and a source road polyline.

FIGS. 5A-5C illustrate example computations of an angle between a target road polyline 516 and a source road polyline 514, in accordance with some embodiments of the present disclosure. In FIG. 5B, the angle is computed in a first conflation direction (target to source) by projecting two vertices (e.g., the two end vertices) of target road polyline 516 onto source road polyline 514, resulting in a set of target-to-source projections that connect with source road polyline 514 at a set of connection points along source road polyline 514. Projecting a vertex of target road polyline 516 onto source road polyline 514 may include identifying the shortest distance to source road polyline 514, whether connecting to a vertex or a line segment of source road polyline 514. A first vector may be formed by connecting the two vertices of target road polyline 516 and a second vector may be formed by connecting the two connection points along source road polyline 514. The angle in the first conflation direction is set equal to the minimum angle formed between the first vector and the second vector.

In FIG. 5C, the angle is computed in a second conflation direction (source to target) by projecting two vertices (e.g., the two end vertices) of source road polyline 514 onto target road polyline 516, resulting in a set of source-to-target projections that connect with target road polyline 516 at a set of connection points along target road polyline 516. Projecting a vertex of source road polyline 514 onto target road polyline 516 may include identifying the shortest distance to target road polyline 516, whether connecting to a vertex or a line segment of target road polyline 516. A first vector may be formed by connecting the two vertices of source road polyline 514 and a second vector may be formed by connecting the two connection points along target road polyline 516. The angle in the second conflation direction is set equal to the minimum angle formed between the first vector and the second vector.

Figure 6:
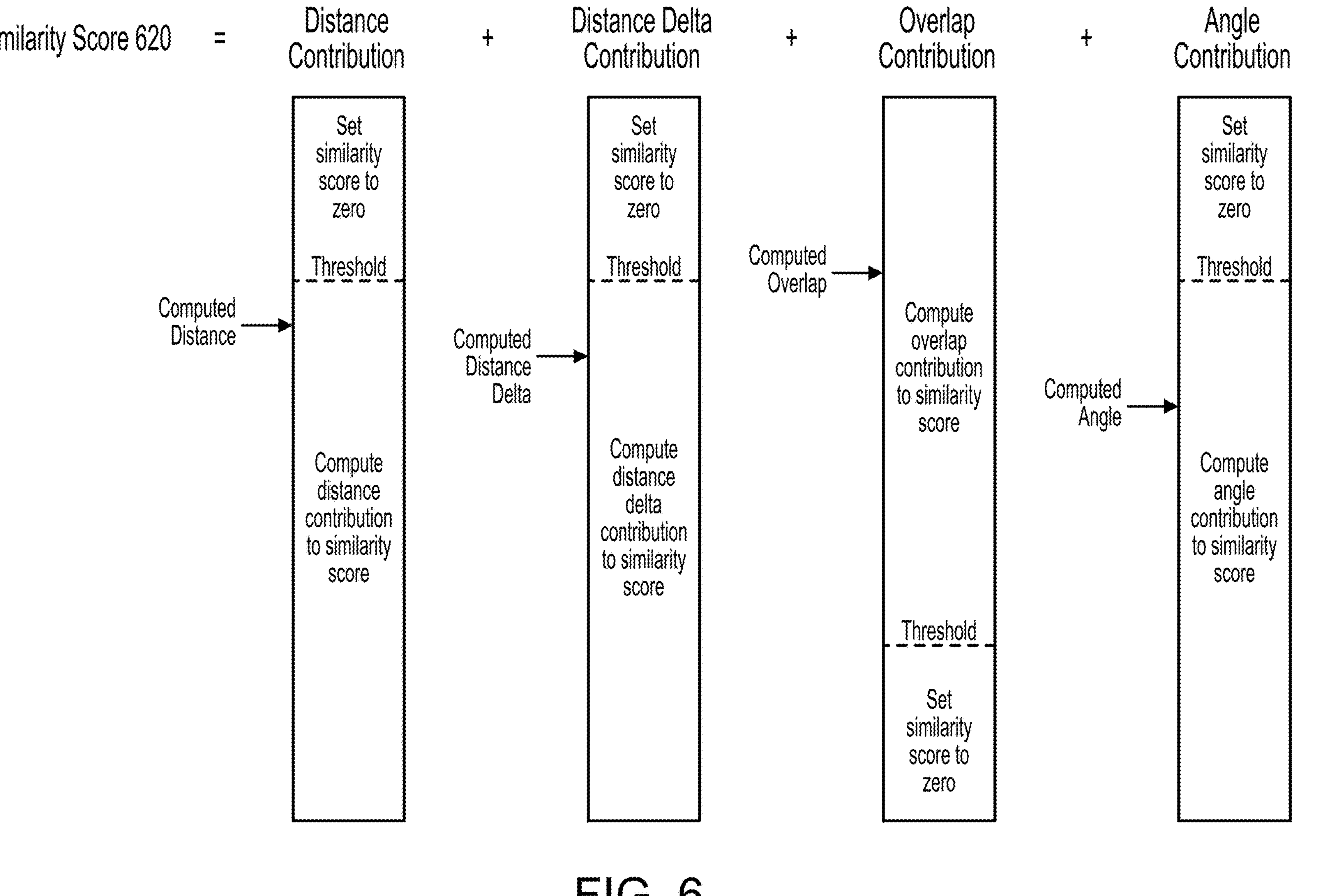
FIG. 6 illustrates an example computation of a similarity score between a target road polyline and a source road polyline.

FIG. 6 illustrates an example computation of a similarity score 620 between a target road polyline and a source road polyline, in accordance with some embodiments of the present disclosure. Similarity score 620 may be computed based on one or more similarity metrics including distance, distance delta, overlap, and angle. In some examples, similarity score 620 may be computed by summing the contributions from the similarity metrics, including a distance contribution, a distance delta contribution, an overlap contribution, and/or an angle contribution. In some examples, the computed similarity metrics may be compared to corresponding thresholds, and similarity score 620 may be set to zero if the computed similarity metrics are greater than (or less than) the corresponding thresholds.

In the illustrated example, the computed distance is compared to a distance threshold. If the computed distance is greater than the distance threshold, similarity score 620 is set to zero. Otherwise, the distance contribution to similarity score 620 is computed based on the computed distance and is summed (and optionally weighted) with other contributions. Further in the illustrated example, the computed distance delta is compared to a distance delta threshold. If the computed distance delta is greater than the distance delta threshold, similarity score 620 is set to zero. Otherwise, the distance delta contribution to similarity score 620 is computed based on the computed distance delta and is summed (and optionally weighted) with other contributions.

Further in the illustrated example, the overlap is compared to an overlap threshold. If the computed overlap is less than the overlap threshold, similarity score 620 is set to zero. Otherwise, the overlap contribution to similarity score 620 is computed based on the computed overlap and is summed (and optionally weighted) with other contributions. Further in the illustrated example, the computed angle is compared to an angle threshold. If the computed angle is greater than the angle threshold, similarity score 620 is set to zero. Otherwise, the angle contribution to similarity score 620 is computed based on the computed angle and is summed (and optionally weighted) with other contributions.

Figure 7:
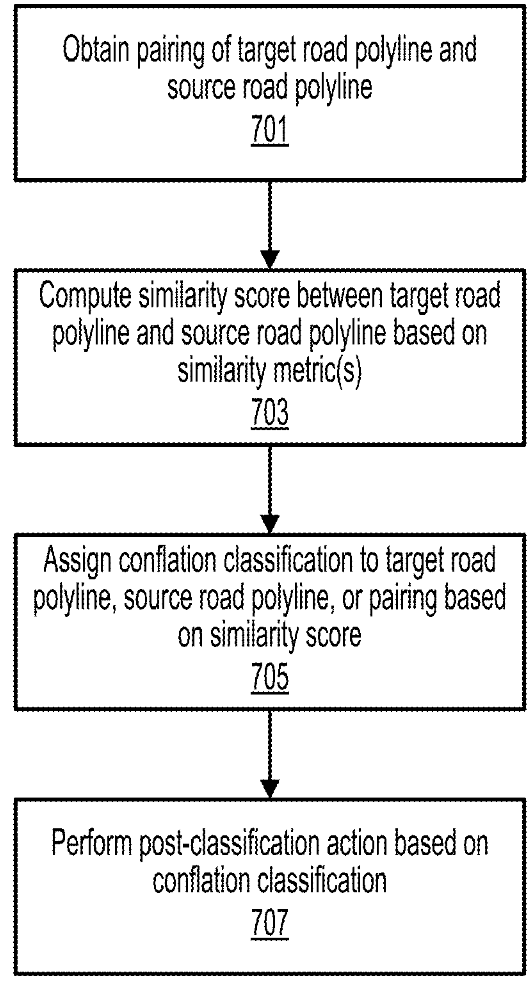
FIG. 7 illustrates a method of performing conflation between target road polylines and source road polylines.

FIG. 7 illustrates a method 700 of performing conflation between target road polylines and source road polylines, in accordance with some embodiments of the present disclosure. Steps of method 700 may be performed in any order and/or in parallel, and one or more steps of method 700 may be optionally performed. One or more steps of method 700 may be performed by one or more processors, such as those included in a navigation computer located at a vehicle or remote from a vehicle. Method 700 may be implemented as a computer-readable medium or computer program product comprising instructions which, when the program is executed by one or more processors, cause the one or more processors to carry out the steps of method 700.

At step 701, a pairing a target road polyline (e.g., target road polylines 116, 216, 316, 416, 516) and a source road polyline (e.g., source road polylines 114, 214, 314, 414, 514) is obtained. The target road polyline may be obtained from a set of target road polylines (e.g., target road polylines 116) stored in a target database (e.g., target database 106) and the source road polyline may be obtained from a set of source road polylines (e.g., source road polylines 114) stored in a source database (e.g., source database 104). The target road polyline and the source road polyline may each include a sequence of connected vertices that form a continuous line. The connected vertices may be 2D (e.g., latitude and longitude) or 3D vertices.

At step 703, a similarity score (e.g., similarity scores 120, 620) between the target road polyline and the source road polyline is computed based on one or more similarity metrics (e.g., similarity metrics 122). The one or more similarity metrics may include a distance between the target road polyline and the source road polyline, a distance delta between the target road polyline and the source road polyline, an overlap between the target road polyline and the source road polyline, or an angle between the target road polyline and the source road polyline.

At step 705, a conflation classification (e.g., conflation classifications 124) is assigned to the target road polyline, the source road polyline, or the pairing based on the similarity score. The conflation classification may be one of a set of possible conflation classifications including a match classification, a conflict classification, an add classification, or an unmatched classification.

At step 707, a post-classification action (e.g., post-classification action 128) is performed based on the conflation classification. Performing the post-classification action may include adding the source road polyline to the set of target road polylines as stored in a target database, modifying the sequence of connected vertices of the target road polyline as stored in the target database based on the sequence of connected vertices of the source road polyline, or deleting the target road polyline from the target database. In many cases, performing the post-classification action may include modifying one or more of the set of target road polylines as stored in a target database. In some examples, the post-classification action may be performed further based on road attributes (e.g., road name, route number, address range, etc.) extracted from the source road polyline and/or the target road polyline. In some cases (such as for a match classification), the road attributes for the target road polyline may be modified to include one or more of the road attributes for the source road polyline. In some examples, method 700 may be performed for all possible pairings of target road polylines and source road polylines.

Figure 8:
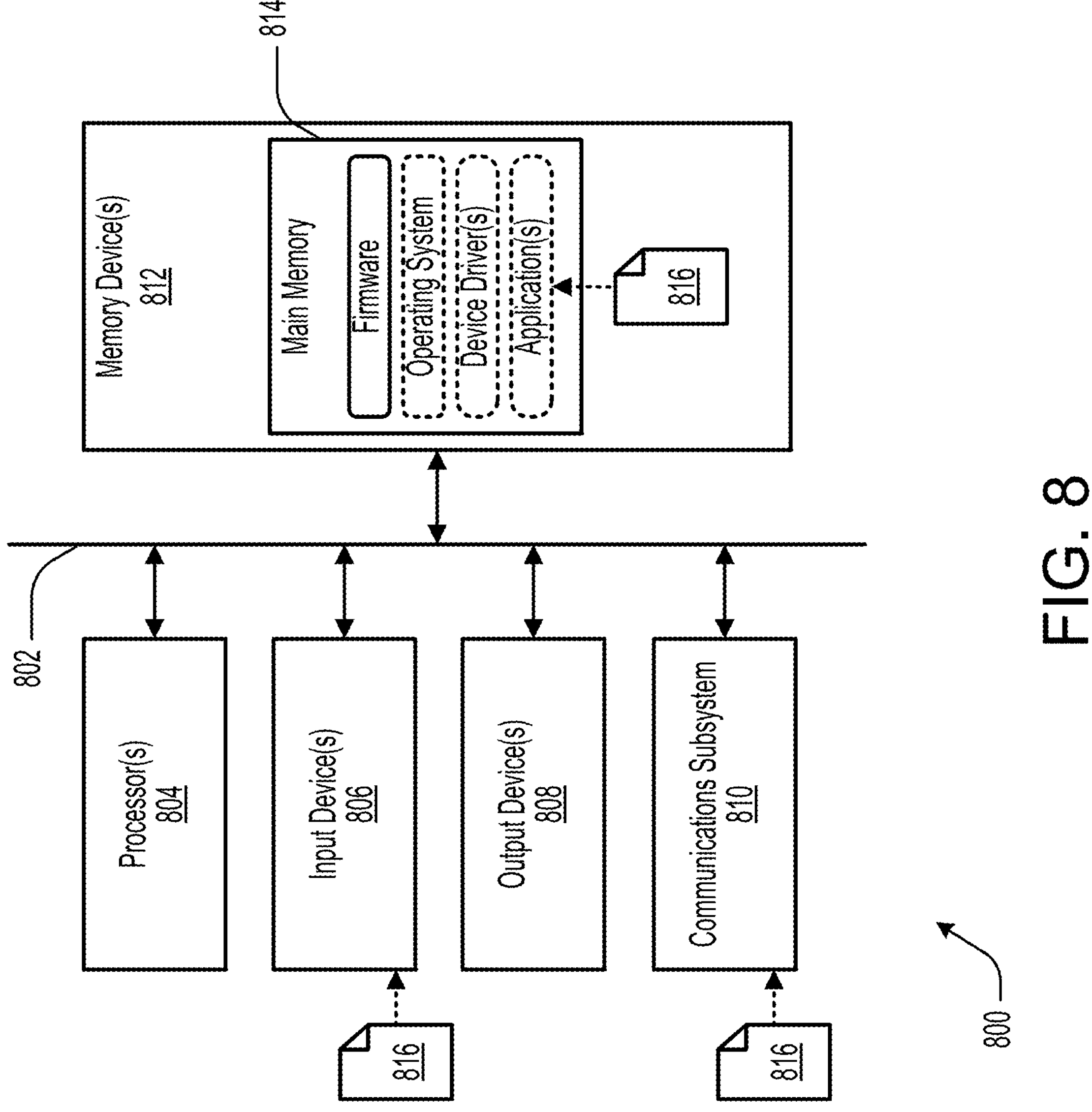
FIG. 8 illustrates an example computer system comprising various hardware elements.

FIG. 8 illustrates an example computer system 800 comprising various hardware elements, in accordance with some embodiments of the present disclosure. Computer system 800 may be incorporated into or integrated with devices described herein and/or may be configured to perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812.

Computer system 800 may be implemented using various hardware implementations and embedded system technologies. For example, one or more elements of computer system 800 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 800 may be communicatively coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 802 may include one or more buses that connect the pins of the hardware elements of computer system 800. For example, communication medium 802 may include a bus that connects processor(s) 804 with main memory 814, referred to as a system bus, and a bus that connects main memory 814 with input device(s) 806 or output device(s) 808, referred to as an expansion bus. The system bus may itself consist of several buses, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 804 may include one or more multi-core processors, in which each core may read and execute program instructions concurrently with the other cores, increasing speed for programs that support multithreading.

Input device(s) 806 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 806 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, a haptic or tactile device, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, and may be controlled using control signals generated by computer system 800.

Communications subsystem 810 may include hardware components for connecting computer system 800 to systems or devices that are located external to computer system 800, such as over a computer network. In various embodiments, communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks.

While processor(s) 804 and memory device(s) 812 are illustrated as being separate elements, it should be understood that processor(s) 804 may include varying levels of on-processor memory, such as processor registers and caches that may be utilized by a single processor or shared between multiple processors.

Memory device(s) 812 may include main memory 814, which may be directly accessible by processor(s) 804 via the address and data buses of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as RAM, such as dynamic random-access memory (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 816, which are executable by computer system 800. In one example, such instructions 816 may be received by computer system 800 using communications subsystem 810 (e.g., via a wireless or wired signal that carries instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instructions 816 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 800. For example, the non-transitory computer-readable medium may be one of memory device(s) 812 (as shown in FIG. 8). In some cases, the non-transitory computer-readable medium may be separate from computer system 800. In one example, the non-transitory computer-readable medium may be a removable medium provided to input device(s) 806 (as shown in FIG. 8), such as those described in reference to input device(s) 806, with instructions 816 being read into computer system 800 by input device(s) 806. In another example, the non-transitory computer-readable medium may be a component of a remote electronic device, such as a mobile phone, that may wirelessly transmit a data signal that carries instructions 816 to computer system 800 and that is received by communications subsystem 810 (as shown in FIG. 8).

Instructions 816 may take any suitable form to be read and/or executed by computer system 800. For example, instructions 816 may be source code (written in a human-readable programming language such as Java, C, C++, C#, Python), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an executable file with machine code that may immediately be read into main memory 814 for execution by processor(s) 804. In various examples, instructions 816 may be provided to computer system 800 in encrypted or unencrypted form, compressed or uncompressed form, as an installation package or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory computer-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer-program product that includes instructions (e.g., instructions 816) is provided to perform methods in accordance with various embodiments of the present disclosure. The computer-program product may be tangibly embodied in a non-transitory computer-readable medium (e.g., memory device(s) 812 or main memory 814). The instructions may be configured to cause one or more processors (e.g., processor(s) 804) to perform the methods described in the various embodiments.

In another aspect of the present disclosure, a non-transitory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms “a”, “an”, and “the” include plural references unless the context clearly dictates otherwise. Thus, for example, reference to “a user” includes reference to one or more of such users, and reference to “a processor” includes reference to one or more processors and equivalents thereof known to those skilled in the art, and so forth.

Also, the words “comprise,” “comprising,” “contains,” “containing,” “include,” “including,” and “includes,” when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of performing conflation between a set of target road polylines and a set of source road polylines, the computer-implemented method comprising:

obtaining a pairing of a target road polyline and a source road polyline, the target road polyline from the set of target road polylines and the source road polyline from the set of source road polylines, wherein the target road polyline and the source road polyline each include a sequence of connected vertices that form a continuous line;

computing a similarity score between the target road polyline and the source road polyline based on one or more similarity metrics;

assigning a conflation classification to the target road polyline, the source road polyline, or the pairing based on the similarity score, the conflation classification being one of a set of possible conflation classifications; and performing a post-classification action on the set of target road polylines as stored in a target database based on the conflation classification, the post-classification action including at least one of:

adding the source road polyline to the set of target road polylines as stored in the target database;

modifying the sequence of connected vertices of the target road polyline as stored in the target database based on the sequence of connected vertices of the source road polyline; or deleting the target road polyline from the target database.

2. The computer-implemented method of claim 1, wherein the one or more similarity metrics include at least one of:

a distance between the target road polyline and the source road polyline;

a distance delta between the target road polyline and the source road polyline;

an overlap between the target road polyline and the source road polyline; or an angle between the target road polyline and the source road polyline.

3. The computer-implemented method of claim 2, wherein the distance between the target road polyline and the source road polyline is computed by:

projecting each of the connected vertices of the target road polyline onto the source road polyline to generate target-to-source projections and identifying a maximum distance of the target-to-source projections; or projecting each of the connected vertices of the source road polyline onto the target road polyline to generate source-to-target projections and identifying a maximum distance of the source-to-target projections.

4. The computer-implemented method of claim 2, wherein the distance delta between the target road polyline and the source road polyline is computed by:

projecting each of the connected vertices of the target road polyline onto the source road polyline to generate target-to-source projections, identifying a maximum distance and a minimum distance of the target-to-source projections, and computing a difference between the maximum distance and the minimum distance of the target-to-source projections; or projecting each of the connected vertices of the source road polyline onto the target road polyline to generate source-to-target projections, identifying a maximum distance and a minimum distance of the source-to-target projections, and computing a difference between the maximum distance and the minimum distance of the source-to-target projections.

5. The computer-implemented method of claim 2, wherein the overlap between the target road polyline and the source road polyline is computed by:

projecting two of the connected vertices of the target road polyline onto the source road polyline to generate target-to-source projections that connect with the source road polyline at a set of connection points along the source road polyline and computing a distance between the set of connection points along the source road polyline; or projecting two of the connected vertices of the source road polyline onto the target road polyline to generate source-to-target projections that connect with the target road polyline at a set of connection points along the target road polyline and computing a distance between the set of connection points along the target road polyline.

6. The computer-implemented method of claim 2, wherein the angle between the target road polyline and the source road polyline is computed by:

projecting two of the connected vertices of the target road polyline onto the source road polyline to generate target-to-source projections that connect with the source road polyline at a set of connection points along the source road polyline and computing an angle between a first vector formed by the two of the connected vertices of the target road polyline and a second vector formed by the set of connection points along the source road polyline; or projecting two of the connected vertices of the source road polyline onto the target road polyline to generate source-to-target projections that connect with the target road polyline at a set of connection points along the target road polyline and computing an angle between a first vector formed by the two of the connected vertices of the source road polyline and a second vector formed by the set of connection points along the target road polyline.

7. The computer-implemented method of claim 2, wherein computing the similarity score between the target road polyline and the source road polyline based on one or more similarity metrics includes setting the similarity score to zero if the one or more similarity metrics are greater than or less than one or more corresponding thresholds.

8. The computer-implemented method of claim 1, wherein the set of source road polylines are retrieved from a government database.

9. The computer-implemented method of claim 1, wherein performing the post-classification action includes modifying one or more of the set of target road polylines as stored in a target database.

10. A non-transitory computer-readable medium comprising instructions that, when executed by one or more processors, cause the one or more processors to perform operations comprising:

obtaining a pairing of a target road polyline and a source road polyline, the target road polyline from a set of target road polylines and the source road polyline from a set of source road polylines, wherein the target road polyline and the source road polyline each include a sequence of connected vertices that form a continuous line;

computing a similarity score between the target road polyline and the source road polyline based on one or more similarity metrics;

assigning a conflation classification to the target road polyline, the source road polyline, or the pairing based on the similarity score, the conflation classification being one of a set of possible conflation classifications; and performing a post-classification action on the set of target road polylines as stored in a target database based on the conflation classification, the post-classification action including at least one of:

adding the source road polyline to the set of target road polylines as stored in the target database;

modifying the sequence of connected vertices of the target road polyline as stored in the target database based on the sequence of connected vertices of the source road polyline; or deleting the target road polyline from the target database.

11. The non-transitory computer-readable medium of claim 10, wherein the one or more similarity metrics include at least one of:

a distance between the target road polyline and the source road polyline;

a distance delta between the target road polyline and the source road polyline;

an overlap between the target road polyline and the source road polyline; or an angle between the target road polyline and the source road polyline.

12. The non-transitory computer-readable medium of claim 11, wherein the distance between the target road polyline and the source road polyline is computed by:

projecting each of the connected vertices of the target road polyline onto the source road polyline to generate target-to-source projections and identifying a maximum distance of the target-to-source projections; or projecting each of the connected vertices of the source road polyline onto the target road polyline to generate source-to-target projections and identifying a maximum distance of the source-to-target projections.

13. The non-transitory computer-readable medium of claim 11, wherein the distance delta between the target road polyline and the source road polyline is computed by:

projecting each of the connected vertices of the target road polyline onto the source road polyline to generate target-to-source projections, identifying a maximum distance and a minimum distance of the target-to-source projections, and computing a difference between the maximum distance and the minimum distance of the target-to-source projections; or projecting each of the connected vertices of the source road polyline onto the target road polyline to generate source-to-target projections, identifying a maximum distance and a minimum distance of the source-to-target projections, and computing a difference between the maximum distance and the minimum distance of the source-to-target projections.

14. The non-transitory computer-readable medium of claim 11, wherein the overlap between the target road polyline and the source road polyline is computed by:

projecting two of the connected vertices of the target road polyline onto the source road polyline to generate target-to-source projections that connect with the source road polyline at a set of connection points along the source road polyline and computing a distance between the set of connection points along the source road polyline; or projecting two of the connected vertices of the source road polyline onto the target road polyline to generate source-to-target projections that connect with the target road polyline at a set of connection points along the target road polyline and computing a distance between the set of connection points along the target road polyline.

15. A system comprising:

one or more processors; and a computer-readable medium comprising instructions that, when executed by the one or more processors, cause the one or more processors to perform operations comprising:

obtaining a pairing of a target road polyline and a source road polyline, the target road polyline from a set of target road polylines and the source road polyline from a set of source road polylines, wherein the target road polyline and the source road polyline each include a sequence of connected vertices that form a continuous line;

computing a similarity score between the target road polyline and the source road polyline based on one or more similarity metrics;

assigning a conflation classification to the target road polyline, the source road polyline, or the pairing based on the similarity score, the conflation classification being one of a set of possible conflation classifications; and performing a post-classification action on the set of target road polylines as stored in a target database based on the conflation classification, the post-classification action including at least one of:

adding the source road polyline to the set of target road polylines as stored in the target database;

modifying the sequence of connected vertices of the target road polyline as stored in the target database based on the sequence of connected vertices of the source road polyline; or deleting the target road polyline from the target database.

16. The system of claim 15, wherein the one or more similarity metrics include at least one of:

a distance between the target road polyline and the source road polyline;

a distance delta between the target road polyline and the source road polyline;

an overlap between the target road polyline and the source road polyline; or an angle between the target road polyline and the source road polyline.

17. The system of claim 16, wherein the distance between the target road polyline and the source road polyline is computed by:

projecting each of the connected vertices of the target road polyline onto the source road polyline to generate target-to-source projections and identifying a maximum distance of the target-to-source projections; or projecting each of the connected vertices of the source road polyline onto the target road polyline to generate source-to-target projections and identifying a maximum distance of the source-to-target projections.

18. The system of claim 16, wherein the distance delta between the target road polyline and the source road polyline is computed by:

projecting each of the connected vertices of the target road polyline onto the source road polyline to generate target-to-source projections, identifying a maximum distance and a minimum distance of the target-to-source projections, and computing a difference between the maximum distance and the minimum distance of the target-to-source projections; or projecting each of the connected vertices of the source road polyline onto the target road polyline to generate source-to-target projections, identifying a maximum distance and a minimum distance of the source-to-target projections, and computing a difference between the maximum distance and the minimum distance of the source-to-target projections.

19. The system of claim 16, wherein the overlap between the target road polyline and the source road polyline is computed by:

projecting two of the connected vertices of the target road polyline onto the source road polyline to generate target-to-source projections that connect with the source road polyline at a set of connection points along the source road polyline and computing a distance between the set of connection points along the source road polyline; or projecting two of the connected vertices of the source road polyline onto the target road polyline to generate source-to-target projections that connect with the target road polyline at a set of connection points along the target road polyline and computing a distance between the set of connection points along the target road polyline.

* * * * *